Patented Jan. 17, 1933

1,894,848

UNITED STATES PATENT OFFICE

JULES BLANCHOD AND ADOLF WIRZ, OF BASEL, SWITZERLAND, ASSIGNORS TO THE FIRM OF SOCIETY OF CHEMICAL INDUSTRY IN BASLE, OF BASEL, SWITZERLAND

SULPHURIZED DYESTUFF AND PROCESS OF MAKING SAME

No Drawing. Application filed October 14, 1931, Serial No. 568,872, and in Switzerland October 24, 1930.

This invention relates to the manufacture of sulphurized dyestuffs. It comprises the process of making these dyestuffs, and the dyestuffs themselves.

In U. S. Patents Nos. 1,565,736, 1,662,415, and 1,695,756 there are described sulphurized dyestuffs which are obtained by treating leuco-phenols derived from paranitrosophenols and carbazole with sulphur at a high temperature in the presence of aliphatic compounds which split off $NH_3$ when heated, such as urea, dicyane-diamide, thiourea etc., and aromatic bases or products which split off aromatic bases when heated under the conditions at which the sulphurization is taking place, such as diphenylurea, ditolylurea etc. These dyestuffs yield more or less reddish tints. In order to obtain greenish tints there is substituted, wholly or in part, for the leuco indophenol from carbazole a leuco-indophenol from an N-alkylcarbazole.

In all these processes the operations were always so conducted that the sulphur required for the sulphurization was in part added to the sulphurization mixture as polysulphide (in order partly to reduce the indophenol) and in part as solid sulphur.

According to the present invention, by using leuco-indophenol from pure carbazole and adding the whole sulphur in finely dispersed form to the leuco-body, there are obtained dyestuffs which dye extraordinarily strong, pure and greenish tints and as a rule yield clear vats suitable for dyeing with apparatus. The fine dispersion may be secured by incorporating with the leuco-indophenol and the admixed bodies the total quantity of sulphur which is to be used in the baking operation in the dissolved form as sodium polysulphide, and then precipitating the sulphur by means of a suitable quantity of ammonium chloride. Equally well the sulphur may be added in the form of ammonium polysulphide. The fine dispersion of the sulphur may also be produced by addition of a dispersing agent, which then at the same time produces a fine dispersion of the admixed bodies. The invention is applicable not only to the indophenols from pure carbazole but also to the indophenols from N-alkylcarbazoles.

The following examples illustrate the invention, the parts being by weight:—

Example 1

27.2 parts of the indophenol from carbazole and nitrosophenol of the formula

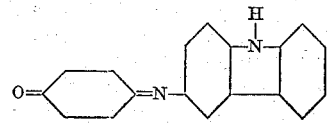

are reduced by means of a polysulphide solution consisting of 58 parts of crystallized sodium sulphide and 23.2 parts of sulphur. There are then added to the paste thus formed 12 parts of urea, 12 parts of symmetrical di-ortho-tolylurea and 22 parts of ammonium chloride and the whole is dried in a vacuum. The comminuted product is then baked at 200–205° C. until the evolution of hydrogen sulphide has ceased. After cooling, the mass is finely ground and extracted by means of dilute sodium sulphide solution. The dyestuff dyes cotton in clear vats greenish-blue tints, such as have hitherto been obtained only with aid of leuco-indophenols from N-alkylcarbazoles.

Example 2

27.2 parts of indophenol from pure carbazole and nitrosophenol are reduced by means of a solution of ammonium polysulphide which contains 24 parts of dissolved sulphur, and the whole is mixed with 12 parts of urea and 12 parts of symmetrical di-ortho-tolylurea and dried in a vacuum. It is then baked at 200–205° C. and the sulphur in it is extracted by means of dilute sodium sulphide solution. It dyes cotton in a yellow vat tints which are still somewhat more greenish than those obtained by means of the dyestuff described in Example 1.

Example 3

27.2 parts of the indophenol from carbazole and nitrosophenol are reduced as described in Example 2 and the mass is mixed with 16 parts of urea, 16 parts of symmetrical di-ortho-tolylurea and an aqueous solution of 4 parts of caustic soda and the whole is then dried in a vacuum. The baking is conducted at 200–205° C. until evolution of hydrogen sulphide has ceased. The dyestuff when extracted by means of sodium sulphide solution dyes cotton in a yellow vat tints similar to those obtained from the product of Example 2.

In like manner the operation may be conducted with aid of the other added bodies which are recommended in the specifications referred to in the second paragraph hereof, or with other leuco-indophenols. The dispersing agents, such as the sulphoricinates, derivatives of aromatic sulphonic acids or thiophenols may be added with advantage in the reducing operation or during the incorporation with the added bodies.

*Example 4*

27.2 parts of the indophenol from carbazole and nitrosophenol are reduced as described in Example 1 and to the paste thus produced there are added 16 parts of urea, 16 parts of symmetrical di-ortho-tolylguanidine, 15–20 parts of common salt and an aqueous solution of 22 parts of ammonium chloride. The whole is dried in a vacuum and the comminuted dried material is baked at 200–205° C. until evolution of hydrogen sulphide has ceased. When cold, the finely ground dyestuff is treated with dilute sodium sulphide solution. It dyes cotton tints which are considerably more greenish than those obtainable from the dyestuffs described in Examples 1 to 3. The vat is clearer than the vats of the known dyestuff mixtures from sulphurization products from the indophenols from carbazole and N-alkylcarbazoles with otherwise equally strong greenish tinged shades.

Instead of the symmetrical di-ortho-tolylguanidine there may be used the diphenyl-derivative, whereby dyeings having a somewhat more reddish tint are obtained.

What we claim is:—

In the manufacture of sulphurized dyestuffs by baking the leuco-compound of the indophenol from carbazole and nitrophenol in the presence of sulphur, of products splitting off ammonia when heated, and of organic bases, the improvement consisting in the feature of adding the whole sulphur in finely dispersed form, the fine dispersion of the sulphur being secured by decomposition of a polysulphide in the sulphurization mass.

In witness whereof we have hereunto signed our name this 7th day of October 1931.

JULES BLANCHOD.
ADOLF WIRZ.